(12) United States Patent
Young et al.

(10) Patent No.: US 11,806,964 B2
(45) Date of Patent: Nov. 7, 2023

(54) DOPANT FOR IMPROVING CASTING AND ELECTROPLATING PERFORMANCE

(71) Applicant: Honeywell Federal Manufacturing & Technologies, LLC, Kansas City, MO (US)

(72) Inventors: Barbara Diane Young, Raymore, MO (US); Steven James Sedlock, Raymore, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 125 days.

(21) Appl. No.: 17/462,273

(22) Filed: Aug. 31, 2021

(65) Prior Publication Data

US 2023/0063553 A1   Mar. 2, 2023

(51) Int. Cl.
| | | |
|---|---|---|
| *B32B 15/01* | (2006.01) | |
| *C25D 3/44* | (2006.01) | |
| *C25D 3/38* | (2006.01) | |
| *C25D 7/12* | (2006.01) | |

(52) U.S. Cl.
CPC .......... *B32B 15/017* (2013.01); *B32B 15/012* (2013.01); *Y10T 428/1275* (2015.01); *Y10T 428/12903* (2015.01); *Y10T 428/12944* (2015.01); *Y10T 428/12951* (2015.01)

(58) Field of Classification Search
None
See application file for complete search history.

(56) References Cited

U.S. PATENT DOCUMENTS

| | | | |
|---|---|---|---|
| 4,323,419 A | 4/1982 | Wakefield | |
| 6,274,078 B1 | 8/2001 | Dunyak et al. | |
| 9,847,438 B2 | 12/2017 | Zhu | |
| 2003/0209137 A1* | 11/2003 | Tsushima | F04B 27/0886 91/499 |
| 2020/0377370 A1* | 12/2020 | Abd Elhamid | C01B 33/021 |
| 2021/0025071 A1* | 1/2021 | Saito | H01M 50/124 |

FOREIGN PATENT DOCUMENTS

CN    107881378 A  *  4/2018 .............. C22C 1/02

OTHER PUBLICATIONS

Cui et al., "Study on the improvement of electrical conductivity and mechanical properties of low alloying electrical aluminum alloys", Composites Part B, vol. 110 (2017), Available online at: http:dx.doi.org/10.1016/j.compositesb.2016.11.042; Nov. 17, 2016, pp. 381-387.

* cited by examiner

*Primary Examiner* — Xiaobei Wang
(74) *Attorney, Agent, or Firm* — Erise IP, P.A.

(57) ABSTRACT

Systems, methods, components, and parts are provided for improving casting and electroplating performance of a plated cast part by doping a semiconductor material with an electrically active dopant before mixing the semiconductor material into a base material. The doped semiconductor material improves the castability of the base material and has an improved electrical conductivity which is closer to that of the base material such that a consistency of a subsequent plating on the part is improved.

17 Claims, 6 Drawing Sheets

DOPANT FOR IMPROVING CASTING AND ELECTROPLATING PERFORMANCE

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to cast parts. More specifically, embodiments of the invention relate to improving casting and electroplating performance using a dopant added to the material of a cast part.

2. Related Art

In some examples of casting technologies, semiconductor materials, such as silicon, have been added to a base material, such as aluminum, to reduce an overall viscosity of the mixture, such that the mixture flows easier during the casting process. However, the semiconductor material typically has a lower electrical conductivity than the base material and may separate out from the base material, which may negatively affect a subsequent electroplating process.

Electroplating processes are generally used to create a metal coating or "plating" on an outer surface of a cast part by applying a direct electrical current. Therefore, successful electroplating processes rely on an electrically conductive base material, such as a metal. Accordingly, adding a semiconductor material to the metal may be detrimental to the electroplating process due to a non-uniform electrical conductivity associated with the addition and eventual separation of the semiconductor material. In some instances, the semiconductor material may segregate out of the mixture such that the electrical conductivity of the cast part becomes non-homogeneous and the electroplating process produces non-uniform splotches on the outer surface of the cast part.

SUMMARY

Embodiments of the invention solve the above-mentioned problems by providing a mixture including a base material and a doped semiconductor with an increased electrical conductivity such that the consistency of the electroplating process is improved.

A first embodiment of the invention is directed to a cast part having an outer surface comprising a first base material, and a second material comprising a semiconductor material doped with an electrically active dopant to form a doped semiconductor material, said doped semiconductor material having a greater electrical conductivity than the semiconductor material itself, wherein the first base material and the second material are mixed together to form a mixture and then the mixture is formed into the cast part, and a plating layer disposed on at least a portion of the outer surface of the cast part, wherein a uniformity of the plating layer is improved due to the electrical conductivity of the mixture.

A second embodiment of the invention is directed to a method for producing a plated cast part, the method comprising doping a semiconductor material with an electrically active dopant to form a doped semiconductor material with an increased electrical conductivity, mixing the doped semiconductor material with a base material to form a mixture having a uniform electrical conductivity, forming the mixture into a cast part using a casting process, and applying a plating material to an outer surface of the cast part using an electroplating process, wherein a consistency of the electroplating process is improved by the uniform electrical conductivity of the mixture.

A third embodiment of the invention is directed to a plated cast component formed by a process of casting a mixture and electroplating an outer surface of the component, said plated cast component comprising a mixture having a uniform electrical conductivity comprising a base material, and a doped semiconductor material formed by doping a semiconductor material with an electrically active dopant such that an electrical conductivity of the doped semiconductor material is greater than an electrical conductivity of the semiconductor material itself, and a plating disposed on at least a portion of the outer surface of the cast component, wherein the plating is more uniformly distributed due to the electrical conductivity of the mixture.

Additional embodiments of the invention are directed to forming a plated cast part including a base material and a doped semiconductor material with an electrically active dopant to improve the consistency of the electroplating process by increasing the electrical conductivity of the semiconductor material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
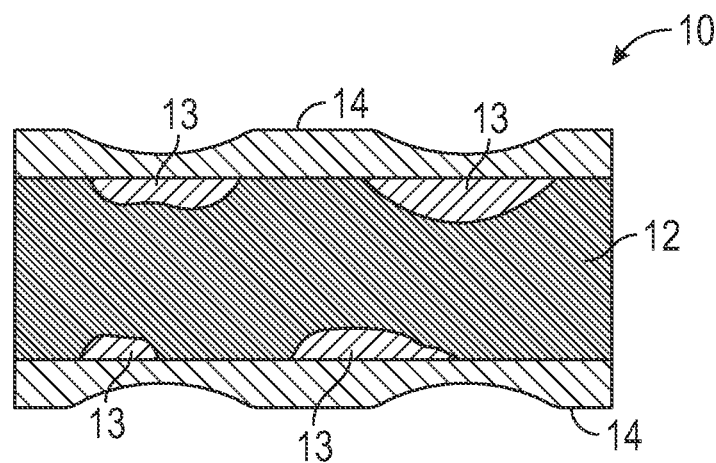
FIG. 1 is a cross-sectional view of an exemplary non-uniform plated cast part.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, a cross-sectional view of an exemplary non-uniform part 10 is depicted. The non-uniform part 10 may be formed using a casting process or another manufacturing process. The non-uniform part 10 may have a cylindrical shape, as shown. However, the non-uniform part 10 may have any suitable shape based on the intended use of the non-uniform part 10. The non-uniform part 10 comprises a mixture of a base material 12 and a semiconductor material 13. For example, the non-uniform part 10 may be formed by mixing aluminum and silicon before a casting process to reduce the viscosity of the mixture below that of the aluminum alone. However, semiconductor materials such as silicon have a lower electrical conductivity than aluminum, which may affect a subsequent electroplating process.

The non-uniform part 10 further comprises a non-uniform plating 14 that occurs due to the non-uniformity of electrical conductivity within the mixture especially if the semiconductor material 13 segregates out from the base material 12. Here, the non-uniform plating 14 is created during an electroplating process after the part has been cast. The non-uniform plating 14 may be formed along the outer surface of the non-uniform part 10 and distributed unevenly such that the non-uniform plating 14 is thicker at areas with a higher concentration of the base material 12 since the electrical conductivity is relatively higher at those areas. In some cases, the non-uniform plating 14 comprises non-uniform splotches formed at areas of high conductivity. Accordingly, the non-uniform plating 14 may have a varying thickness based on the non-uniform electrical conductivity of the non-uniform part 10.

The non-uniform plating 14 may not cover the entire intended surface and may produce non-uniform surface properties and splotches. Alternatively, in some cases, the non-uniform plating 14 may cover the entire surface of the non-uniform part 10 but be distributed unevenly such that the thickness of the plating significantly changes in different locations along the outer surface of the non-uniform part 10, as shown. The non-uniform plating 14 may be thinner at areas including more semiconductor material 13 and thicker at areas including more base material 12. Further, it may be difficult to control the quality of the mixture and therefore, the thickness at various locations of the non-uniform plating 14. As such, what is needed is a means to adjust the electrical conductivity of the semiconductor material such that the electrical conductivity of the cast part becomes more uniform to thereby improve the consistency of the electroplating process. Accordingly, in some embodiments, the electrical conductivity of the semiconductor material may be increased by doping with an electrically conducive dopant such that the non-uniform plating 14 is replaced with a uniform plating that covers an intended portion of the part, as will be described below with respect to FIG. 2.

Figure 2:
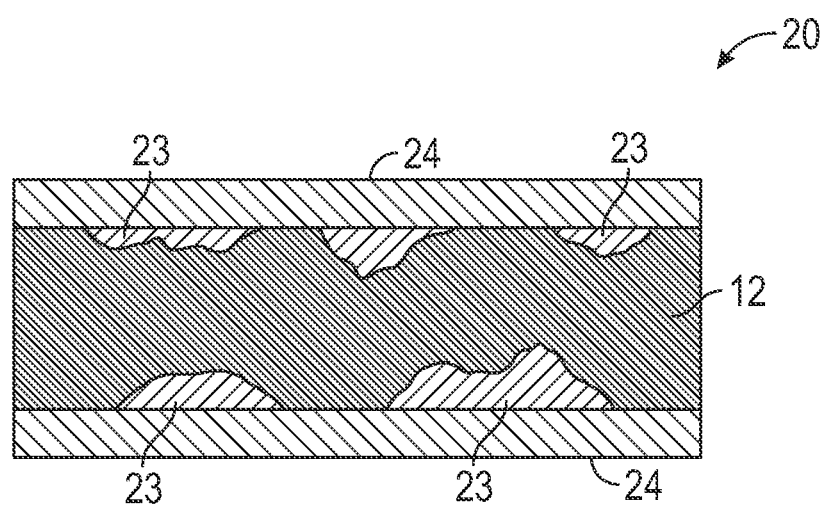
FIG. 2 is a cross-sectional view of a uniform plated cast part relating to some embodiments.

Turning now to FIG. 2, a cross-sectional view of a part 20 is depicted relating to some embodiments. The part 20, which may be cylindrical, as shown, or any other suitable shape, comprises the base material 12, a doped semiconductor material 23, and a plating 24 disposed on at least a portion of an outer surface of the part 20. In some embodiments, the base material 12 may include aluminum such as elemental form of aluminum or an aluminum alloy including aluminum mixed with another substance. For example, in some embodiments, the base material 12 may comprise pure aluminum with a purity of 99% or higher. Further, in some embodiments, another metal or another material may be used as the base material 12. In some embodiments, the part 20 may be formed into a complex component shape for use within an assembly of other components. For example, in some embodiments, the part 20 may be used as a drive shaft component. However, various different uses and component types not described herein are also contemplated. In some embodiments, the plating 24 may be applied using an electroplating process, which may improve one or more surface properties of the part. For example, a plating 24 comprising a nickel material may be included to improve a corrosion resistance of the part 20. Alternatively, in some embodiments, the plating 24 may be applied solely for aesthetic purposes to change the appearance of the part 20. Further still, in some embodiments, the plating 24 may both improve properties and change the aesthetic appearance of the part 20. In some embodiments, the plating 24 may be uniformly applied, as shown, having a uniform thickness that does not vary across the length of the part 20. In other embodiments, the plating may be non-uniformly applied if desired.

As described above, the part 20 may comprise a mixture including the base material 12 and the doped semiconductor material 23. In some embodiments, the part 20 comprises the doped semiconductor material 23 with an added electrically active dopant substance. In such embodiments, the electrically active dopant substance, when added to the semiconductor material through a doping process, increases the electrical conductivity of the semiconductor material. In some embodiments, the semiconductor material may be doped using a doping process such as molecular diffusion or ion implantation, as will be described in further detail below.

In some embodiments, the plating 24 may be applied to a specific portion of the outer surface of the part 20. Alternatively or additionally, in some embodiments, the plating 24 may be applied to an internal surface of the part 20. For example, in some embodiments, the part 20 may include a hollow section, and the plating 24 may be applied to the inner surface of the hollow section. Alternatively, in some embodiments, the plating 24 may be applied to the entire outer surface of the part 20. As described above, the plating 24 may be added to improve the corrosion resistance of the part 20. Alternatively or additionally, the plating 24 may comprise any of a number of different materials and be applied to improve a variety of properties. For example, in some embodiments, the plating 24 may improve the tensile strength of the part 20 and/or the hardness of the outer surface of the part 20.

In some embodiments, the plating 24 is uniformly distributed onto an intended surface of the part 20 due to the more uniform electrical conductivity of the mixture of the base material 12 and the doped semiconductor material 23 with the electrically active dopant. Accordingly, the electrical conductivity of the part 20 becomes more homogeneous even at areas where the doped semiconductor material 23 has segregated out from the base material 12, as depicted in FIG. 2. In some embodiments, a uniformity of the plating 24 is improved due to the electrical conductivity of the mixture of the base material 12 and the doped semiconductor material 23. In some embodiments, the inclusion of the dopant in the doped semiconductor material 23 prevents splotches from forming in the plating 24.

It should be understood that the separation of the mixtures shown in FIGS. 1 and 2 may be exaggerated for the purpose of identifying important features of the invention. For example, in some embodiments, the separation of the doped semiconductor material 23 from the base material 12 may occur at a microscopic level such that magnification may be necessary to examine the separation. However, even at a microscopic level the separation of the doped semiconductor material 23 may still affect the material properties and the consistency of the subsequent electroplating process. Further, in some embodiments, the separation of the doped semiconductor material 23 may occur at least partially before, after, or during a casting process such that some areas remain homogenously mixed while separation occurs in other areas. Accordingly, the electrical conductivity of the semiconductor material may be increased such that the part 20 has a uniform electrical conductivity to improve the consistency of the plating 24 and produce a plating 24 with a uniform thickness, as shown in FIG. 2.

Figure 3:
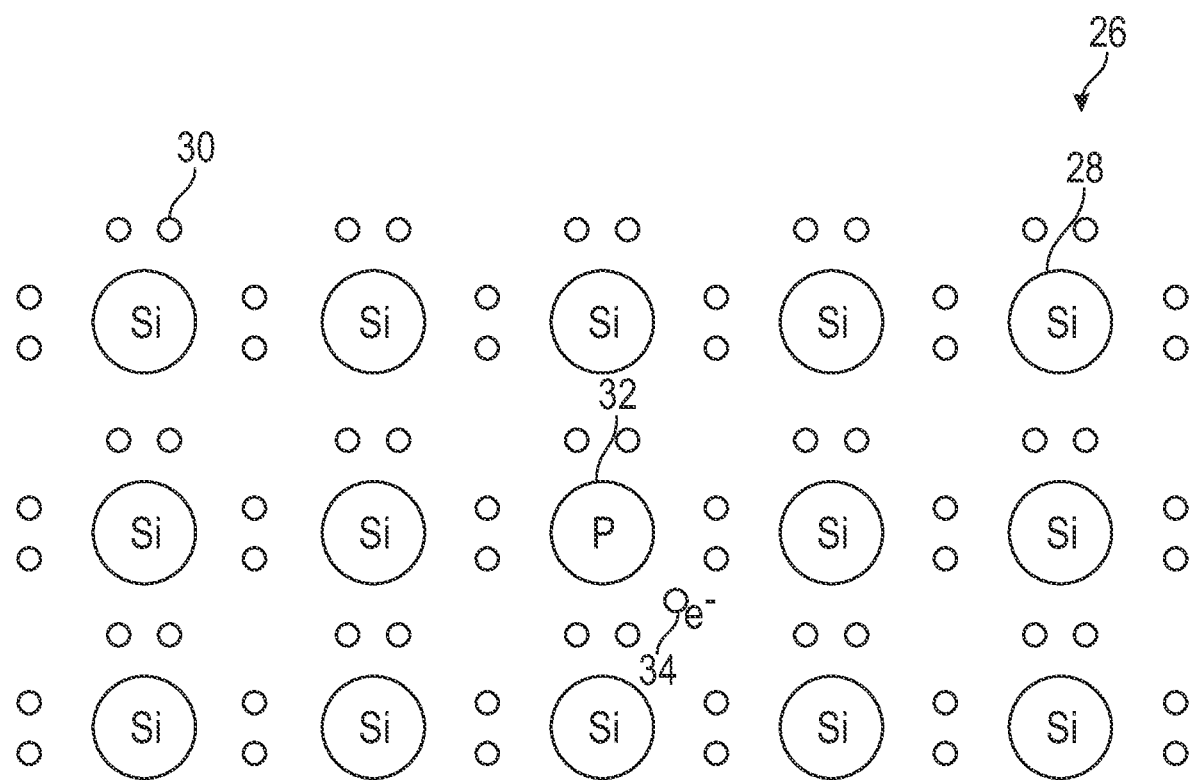
FIG. 3 is an exemplary crystal structure of a doped semiconductor material relating to some embodiments.

Turning now to FIG. 3, an exemplary crystal structure 26 of the doped semiconductor material 23 is depicted relating to some embodiments. The crystal structure 26 comprises one or more semiconductor atoms 28 arranged in an organized crystal structure, as shown. In some embodiments, the semiconductor atoms 28 may be silicon atoms, as shown, however, it should be understood that a variety of suitable semiconductor materials may be used. In some embodiments, the semiconductor material used may be selected based on how the semiconductor material affects the overall viscosity of the mixture when mixed with the base material 12. Additionally, in some embodiments, the semiconductor material may be selected based on how the melting temperature of the mixture is affected. Accordingly, embodiments are contemplated where the mixture of the base material 12 and the doped semiconductor material 23 melts at a melting temperature lower than a melting temperature of the base material 12 alone.

The crystal structure 26 further comprises a plurality of shared electrons 30 which may be shared by specific semiconductor atoms 28 within the crystal structure 26. Additionally, the crystal structure 26 comprises one or more impurity atoms 32 which may replace a respective semiconductor atom 28 within the crystal structure 26. Accordingly, a free electron 34 may be released by incorporation of the dopant impurity atom 32 within the crystal structure 26. The free electron 34 increases the electrical conductivity of the semiconductor material by negatively charging the crystal structure 26. In some embodiments, introduction of the dopant into the semiconductor material increases the electrical conductivity of the semiconductor material by several orders of magnitude.

In some embodiments, the impurity atom 32 may be a phosphorous atom, as shown. However, embodiments are contemplated in which any suitable electrically active dopant material may be used. Further, in some embodiments, dopants may be selected from either of the groups of n-type electron donors or p-type electron acceptors, with n-type electron donors including phosphorous, argon, bismuth, lithium, arsenic, and antimony, and p-type electron acceptors including boron, aluminum, gallium, and indium. In some embodiments, the n-type dopants may negatively charge the crystal structure 26 and the p-type dopants may positively charge the crystal structure 26. However, it should be understood that other suitable dopants not described herein are also contemplated. Further still, in some embodiments, the dopant may include a complex dopant molecule and is not limited to a single elemental compound. It should be understood that, in some embodiments, the electrically active dopant substance may not itself be electrically conductive but may increase the electrical conductivity of the semiconductor material when added as a dopant. In some embodiments, the electrically active dopant substance may be electrically conductive.

In some embodiments, the dopant may be added to the semiconductor material using any of a variety of doping processes. For example, in some embodiments, an inter lattice diffusion process may be used to diffuse a plurality of impurity atoms 32 into the crystal structure 26 of the semiconductor material such that each of the impurity atoms 32 exchanges places with a respective semiconductor atom 28 in the crystal structure 26. Alternatively, in some embodiments, other doping processes may be used such as, for example, an ion implantation process or a vapor phase epitaxy process.

In some embodiments, the semiconductor material may be doped and formed into a synthetic ingot before being mixed with the base material 12 for the casting process. Accordingly, when the materials are mixed, the semiconductor material will have a substantially similar electrical conductivity to the base material 12. In some embodiments, substantially similar may include electrical conductivities within several orders of magnitude. Alternatively, substantially similar may be include electrical conductivities which are more similar when compared to the electrical conductivities of undoped materials. In some embodiments, a specific amount of the dopant may be added such that a specific electrical conductivity of the semiconductor material is achieved. Accordingly, in some embodiments, various doping concentrations are contemplated depending on the specific base material and semiconductor materials used. For example, in some embodiments, the semiconductor material may include pure silicon with an electrical conductivity of about $3.33 \times 10^{-4}$ S/cm. Here, a dopant concentration of about $1 \times 10^{20}$ per cubic centimeter would result in a doped semiconductor material with an electrical conductivity of about $1 \times 10^{3}$ S/cm. Accordingly, in some embodiments, the electrical conductivity of the semiconductor material may be increased by about seven orders of magnitude. In some embodiments, the electrical conductivity of the doped semiconductor material may not be equal to that of the base material but is more similar than the pure undoped semiconductor material. For example, in some embodiments, the doped semiconductor material may be doped silicon with an electrical conductivity of about $1 \times 10^{3}$ S/cm and the base material may be pure aluminum with an electrical conductivity of about $3.7 \times 10^{7}$ S/cm. However, it should be understood that in some embodiments, materials with various different electrical conductivities may be used along with different doping concentrations.

In some embodiments, a specific concentration of the dopant may be used as compared to the semiconductor material such that other properties of the semiconductor material are maintained. For example, in some embodiments, only 1 out of every 100,000 atoms in the semiconductor crystal structure is replaced with a dopant atom. Accordingly, the dopant will increase electrical conductivity without significantly affecting other properties like fluidity and melting temperature. As such, the doped semiconductor material 23 may be mixed with the base material 12 to reduce viscosity for casting, as will be described in further detail below. However, it should be understood that, in some embodiments, various other doping concentrations may be used. Further, in some embodiments, dopants may be selected to adjust other properties of the semiconductor material which will affect the properties of the mixture to be cast, and thus, the part 20 that is formed. For example, embodiments are contemplated in which a dopant is added to the semiconductor material that lowers the melting temperature of the semiconductor material by affecting the bonding energy of the crystal structure 26.

Figure 4:
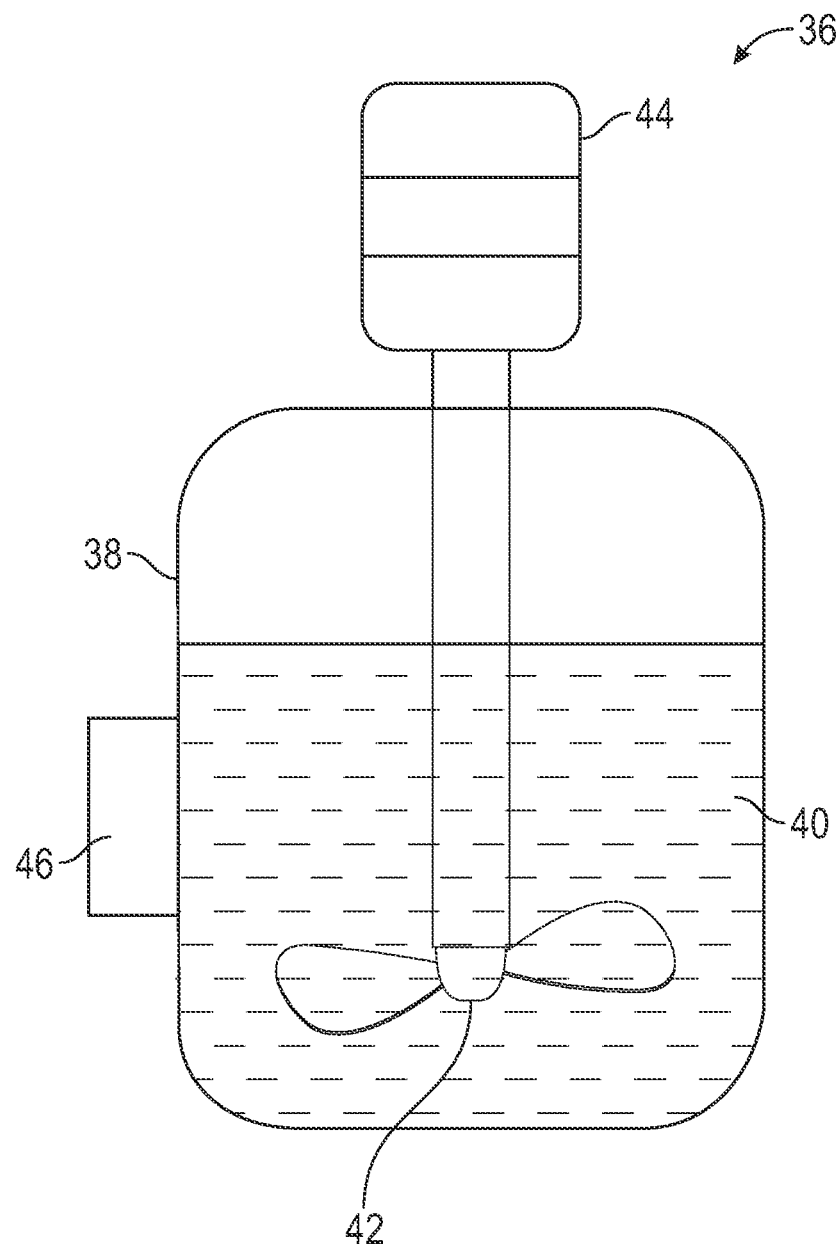
FIG. 4 is a batch reactor relating to some embodiments.

Turning now to FIG. 4, a batch reactor 36 is depicted relating to some embodiments. In some embodiments, the batch reactor 36 may be used to mix the base material 12 and the doped semiconductor material 23 before casting. In some embodiments, the batch reactor 36 may comprise a housing 38 for receiving the materials to be mixed into mixture 40, as shown. Accordingly, in some embodiments, the batch reactor 36 comprises an agitator 42 for mixing materials, such as base material 12 and doped semiconductor material 23, when they are received within the housing 38. In some embodiments, the agitator 42 includes impeller blades attached to a driveshaft disposed in the center of the housing 38. In some embodiments, the agitator 42 may be driven by a motor 44 coupled to the driveshaft to rotate the driveshaft.

In some embodiments, a heater 46 may be included in the batch reactor 36 to heat and/or melt the base material 12 and the doped semiconductor material 23 to facilitate uniform mixing. In some embodiments, the heater 46 may be mounted on an outside surface of the housing 38, as shown. Alternatively, in some embodiments, the heater 46 may be disposed within the housing 38. Further, embodiments are contemplated in which the materials to be mixed may additionally or alternatively be heated before being added to the batch reactor 36.

In some embodiments, the materials may be melted into a liquid form before mixing to improve the mixing process. Accordingly, the heater 46 may heat the materials to a temperature above the melting points of the materials. For example, if aluminum and silicon are mixed in the batch reactor 36, the heater 46 may apply heating such that the temperature exceeds 660.3 degrees Celsius and 1,414 degrees Celsius, which are the respective melting points of aluminum and silicon. Alternatively, in some embodiments, depending on the concentration of silicon within the mixture, the melting point of the mixture may be altered. For example, in some embodiments, between about 11.2 percentage by weight (wt %) of silicon and about 11.8 wt % silicon may be included. In some embodiments, about 11.5 wt % silicon may be included to form a binary eutectic mixture such that the melting point of the mixture becomes lower, such as about 577 degrees Celsius. Alternatively, in some embodiments, the aluminum-silicon mixture may contain anywhere between about 5 wt % silicon to about 25 wt % silicon, or between about 10 wt % silicon to about 15 wt % silicon. Further, embodiments are contemplated in which a variety of different materials are used which may have different melting points and may be mixed at different ratios.

In some embodiments, an aluminum base material and a doped semiconductor material 23 are added into the batch reactor 36. The batch reactor 36 mixes the materials to form a mixture before casting such that a fluidity of the aluminum alloy mixture is increased to improve casting performance. In some embodiments, silicon may be added to the aluminum before casting to reduce the viscosity of the aluminum such that the aluminum flows more easily during casting. Additionally, in some embodiments, adding silicon to the aluminum may decrease the melting temperature of the mixture, as described above, which reduces the heating required for the casting process. Further, in some embodiments, the silicon improves a strength of the aluminum by a slight solution hardening effect. Alternatively, embodiments are contemplated in which other suitable metal alloys are used for the base material 12. For example, in some embodiments, the base material 12 comprises a steel alloy. Further, in some embodiments, other base materials may be used such as copper-based alloys or nickel-based alloys.

In some embodiments, contaminants and oxidation may be avoided during the mixing process. Accordingly, in some embodiments, housing 38 of the batch reactor 36 is sealed. In some embodiments, the batch reactor 36 may not be used and another suitable mixing process may be used. For example, in some embodiments, the materials may be mixed during the casting process or before casting, such as in an induction furnace. Further, embodiments are contemplated in which the mixture is cast directly after mixing. Accordingly, the mixture may be poured into a mold from the batch reactor 36. In some embodiments, the mixture may be cooled and formed into ingots before casting, for example, if the mixture is stored or transported between the mixing process and the casting process. In such embodiments, the ingots may be remelted prior to casting.

Figure 5:
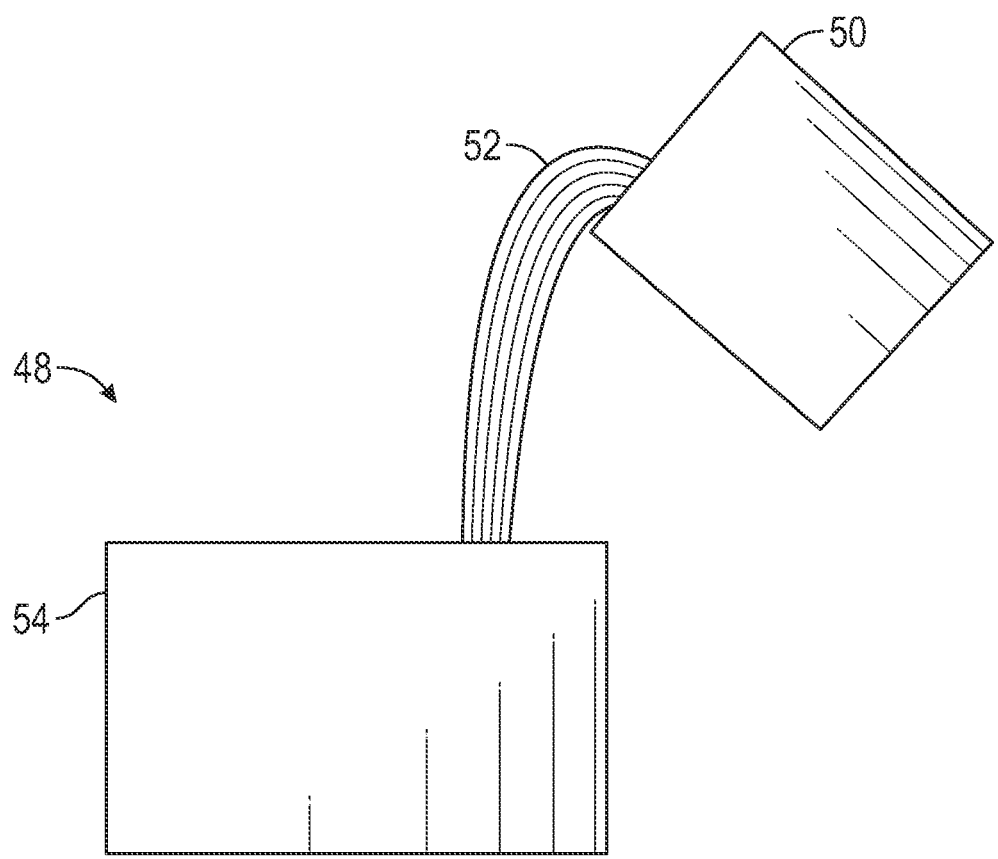
FIG. 5 shows an exemplary casting process for producing a cast part relating to some embodiments.

Turning now to FIG. 5, an exemplary casting process 48 is depicted relating to some embodiments. In some such embodiments, a container 50 may be included to hold a mixture 52. In some embodiments, the mixture 52 comprises a first portion including the base material 12 and a second portion including the doped semiconductor material 23. For example, in some embodiments, the mixture 52 may include an aluminum mixed with doped silicon. In some embodiments, the mixture 52 may be heated and melted within the container 50. In some embodiments, the mixture 52 may be heated and melted elsewhere and transferred to the container 50 prior to casting. Further still, embodiments are contemplated in which the mixture 52 may be poured directly from the batch reactor 36 or some other mixing container.

In some embodiments, the mixture 52 may be a molten mixture that is poured into a mold 54. For example, the mixture 52 may be poured into a hollow cavity of the mold 54 using the container 50, as shown. Accordingly, the mixture 52 flows into the mold, which shapes the mixture 52 and allows the mixture 52 to harden after cooling. In some embodiments, the mold 54 comprises any of a sprue, a riser, a runner, and a core depending on the intended shape and size of the cast part. As such, once the mixture 52 has cooled and solidified, a cast part may be removed from the mold 54. Accordingly, embodiments are contemplated in which the mold 54 comprises one or more removable sections such that the cast part may be easily removed. In some embodiments, the mold 54 may comprise any of a sand material, a ceramic material, or any other suitable material with a melting temperature significantly exceeding that of the mixture 52. In some embodiments, the casting process 48 may be any of a sand casting process, a die casting process, a centrifugal casting process, or an investment casting process, as well as any other suitable casting or molding process capable of forming the part 20 from the mixture 52.

Figure 6:
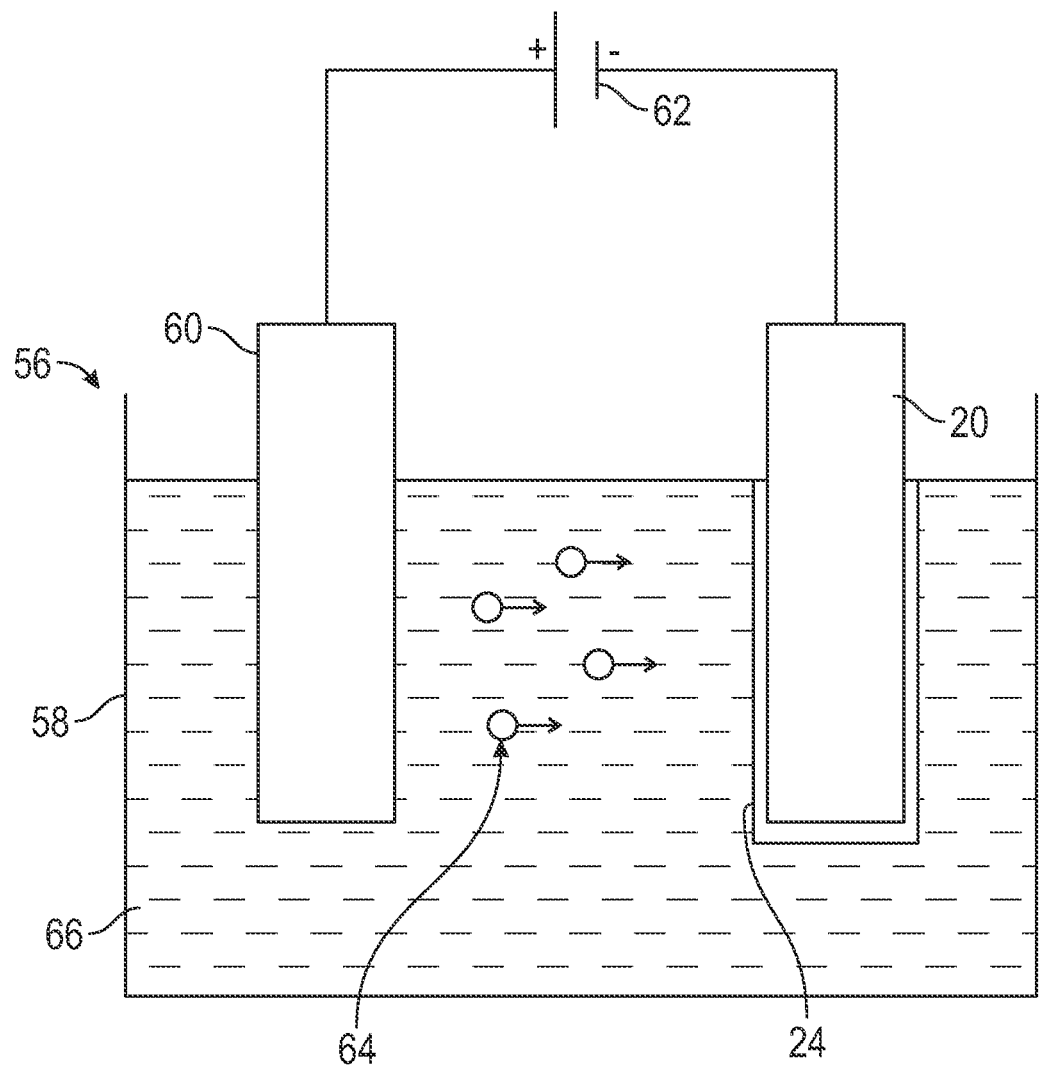
FIG. 6 shows an exemplary electroplating process for applying a plating relating to some embodiments.

Turning now to FIG. 6, an exemplary electroplating process 56 is depicted relating to some embodiments. In some embodiments, the part 20 is placed within an enclosure 58, which may be a large vat or another suitable container including an electroplating solution 66 that may comprise a salt. In some embodiments, electroplating solution 66 may comprise a salt of the metal to be electroplated. For example, if the part 20 is being plated with copper, electroplating solution 66 may comprise a copper sulfate solution. In some embodiments, electroplating solution 66 may comprise a nickel sulfate solution.

In some embodiments, the enclosure 58 may be sealed and pressure controlled. In some embodiments, an electroplating material 60 is disposed within the enclosure 58 adjacent to the part 20, as shown. In some embodiments, the electroplating material 60 may comprise any of nickel, palladium, gold, copper, or another suitable electroplating material. In some embodiments, an electrical circuit is formed between the part 20 and the electroplating material 60. As shown in FIG. 6, power source 62 may be electrically connected to the part 20 and the electroplating material 60. In some embodiments, the power source 62 may be a power source external from the enclosure 58. However, embodiments are contemplated in which a direct electrical connection to the power source 62 may not be included. For example, in some embodiments, the electroplating process may be an electro-magnetic plating process such that magnetic fields are used to provide an electrical current for applying the plating.

In some embodiments, a negative terminal of the power source 62 may be coupled to the part 20 and a positive terminal of the power source 62 may be coupled to the electroplating material 60, as shown. In this case, the part 20 acts as a cathode, the electroplating material 60 acts as an anode, and the electroplating solution 66 acts as an electrolyte. When a current is applied by the power source 62, positively charged ions 64 from the electroplating material 60 are displaced and deposited onto the negatively charged outer surface of the part 20 to form the plating 24 around a surface of the part 20, which includes the base material 12 and the doped semiconductor material 23. In some embodiments, the positively charged ions 64 of the electroplating material 60 may be applied to form a plating 24 of a specific thickness based on various factors, such as a time duration of the electroplating process, the electrical current and/or voltage from the power source, and/or the specific materials used. For example, in some embodiments, the overall time of the electroplating process 56 may be increased to increase the thickness of the plating 24.

In some embodiments, the effectiveness and consistency of the electroplating process 56 may depend on an electrical conductivity of the part 20. Accordingly, the electroplating process 56 is improved by doping the semiconductor material such that the electrical conductivity of the mixture 52 becomes uniform. Here, the electrically active dopant increases the electrical conductivity of the semiconductor material, when added, such that it substantially matches or, in some embodiments, more closely resembles the electrical conductivity of the base material 12. Accordingly, when the plating 24 is applied using the electroplating process 56 or another suitable electroplating process, the plating 24 is uniformly applied to the part 20 and does not form splotches or other surface defects associated with low or non-uniform electrical conductivity.

Figure 7:
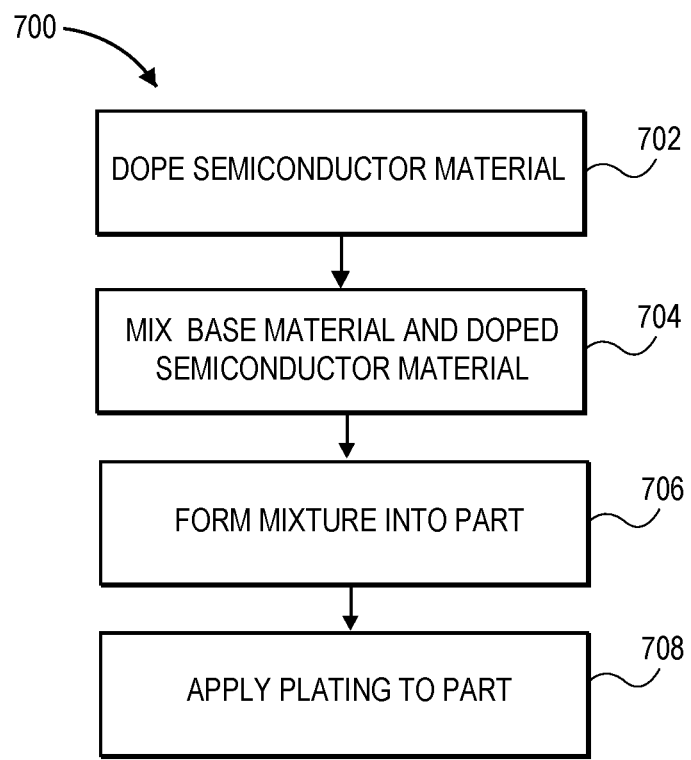
FIG. 7 is a method for producing a plated cast part relating to some embodiments.

Turning now to FIG. 7, a method 700 for producing a plated cast part is depicted relating to some embodiments. At step 702, the semiconductor material is doped using an electrically active dopant, which may be any of the dopants described herein or another suitable electrically active dopant. In some embodiments, the semiconductor material may be purified before the doping process to substantially remove existing impurities from the semiconductor material, which may interfere with the doping process.

At step 704, the doped semiconductor material 23 is mixed with the base material 12. In some embodiments, the doped semiconductor material 23 and the base material 12 are mixed, such as in the batch reactor 36 as described herein with respect to FIG. 4. In some embodiments, the materials may be mixed using another suitable mixing or alloying process.

At step 706, the mixture 52 including a first portion comprising the base material 12 and a second portion comprising the doped semiconductor material 23 is formed into part 20. In some embodiments, the part 20 is formed using a casting process, such as casting process 48 described with respect to FIG. 5. Alternatively, other casting and molding processes are also contemplated for forming the part 20. In some embodiments, mixing the doped semiconductor material 23 into the base material 12 causes the viscosity and melting temperature of the mixture 52 to be reduced, which allows the mixture to flow more easily during the casting process as compared to the base material 12 alone. In some embodiments, the part 20 may be machined after the casting process, for example, to apply a surface finish, fillet or chamfer edges, or remove excess material. In some embodiments, excess casting materials may be removed from the cast part after casting.

At step 708, the plating 24 is applied to at least a portion of an outer surface of the part 20. In some embodiments, the electroplating process 56 described with respect to FIG. 6 is used to apply the plating 24. Additional embodiments are contemplated in which any suitable plating or coating process may be used, such as other types of electroplating processes or coating processes not described herein. In some embodiments, the plating 24 may be applied to improve wear or corrosion resistance or to improve a surface strength of the part 20. In some embodiments, the plating 24 may be for aesthetic purposes.

In some embodiments, the consistency of the plating 24 is improved by the uniform electrical conductivity achieved by doping the semiconductor material with an electrically active dopant. Accordingly, if the doped semiconductor material 23 segregates out of the base material 12 such that the concentrations of the doped semiconductor material 23 are non-homogeneously distributed in the part 20, the separated portions of the mixture will still have closer electrical conductivity to that of the base material 12. As such, when the plating 24 is applied, the plating 24 is evenly distributed and does not form the non-uniform plating 14, as shown in FIG. 1.

In some embodiments, the quality of the improvement in the electroplating process may be measured and tested. Accordingly, uniformity may be measured by examining a cross-section of the part 20. Accordingly, a plurality of measurements may be made on the thickness (e.g., radius or width) of the plating 24. If the variation in the thickness of the plating 24 is low, then it is determined that the electroplating process is successful. However, it should be understood that the measurement process may be varied for different shapes and sizes of parts. Further, in some embodiments, non-destructive testing means may be employed such that the part is not affected by the measurement process. In some embodiments, the plating 24 is uniformly applied and evenly distributed along the outer surface of the part 20.

In some embodiments, any number of additional surface finishing and machining operations may be performed to further modify the plated cast part. For example, in some embodiments, the plated cast part may be cut and formed into multiple parts. In some embodiments, the plated cast part may be used for a variety of applications such as automotive applications, structural applications, medical applications, or other applications where cast parts may be desirable. Further, in some embodiments, the plated cast part may be included in an assembly with one or more additional parts.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A cast part comprising:
a first base material, and
a second material mixed with the first base material,
wherein the second material comprises a doped viscosity reducing semiconductor material that is doped with an electrically active dopant to thereby increase an electrical conductivity of the second material absent the electrically active dopant,
wherein the cast part is formed in part from the mixture of the first base material and the second material, such that the cast part has a substantially uniform electrical conductivity,
wherein the doped viscosity reducing semiconductor material reduces a viscosity of the mixture such that the viscosity of the mixture is lower than a viscosity of the first base material alone,
wherein the second material is at least partially segregated out from the first base material; and
a uniform plating layer disposed on at least a portion of an outer surface of the cast part,
wherein a uniformity of the uniform plating layer is improved due to the substantially uniform electrical conductivity of the cast part.

2. The part of claim 1, wherein the first base material is aluminum and the doped viscosity reducing semiconductor material comprises silicon.

3. The part of claim 1, wherein the electrically active dopant comprises at least one of phosphorous, antimony, arsenic, aluminum, or boron.

4. The part of claim 1, wherein the uniform plating layer comprises nickel that is configured to increase a corrosion resistance of the cast part.

5. The part of claim 1, wherein a melting point of the mixture of the first base material and the second material is below a melting point of the first base material and below a melting point of the doped viscosity reducing semiconductor material.

6. A plated cast component comprising:
a mixture having a uniform electrical conductivity comprising:
a base material, and
a doped viscosity reducing semiconductor material comprising a viscosity reducing semiconductor material that is doped with an electrically active dopant such that an electrical conductivity of the doped viscosity reducing semiconductor material is greater than an electrical conductivity of the viscosity reducing semiconductor material itself,
wherein the doped viscosity reducing semiconductor material reduces a viscosity of the mixture such that the viscosity of the mixture is lower than a viscosity of the base material alone,
wherein the doped viscosity reducing semiconductor material is at least partially segregated out from the base material; and
a uniform plating disposed on at least a portion of the outer surface of the plated cast component,
wherein the uniform plating is more uniformly distributed due to the uniform electrical conductivity of the mixture.

7. The plated cast component of claim 6, wherein the base material is aluminum and the viscosity reducing semiconductor material comprises silicon.

8. The plated cast component of claim 7, wherein the electrically active dopant comprises at least one of phosphorous, antimony, arsenic, aluminum, or boron.

9. The plated cast component of claim 6, wherein the base material is a steel alloy or a copper-based alloy.

10. The plated cast component of claim 6, wherein the doped viscosity reducing semiconductor material comprises a crystal structure comprising a plurality of atoms of a silicon material and a plurality of dopant impurity atoms of the electrically active dopant that replace respective atoms of the silicon material within the crystal structure.

11. The plated cast component of claim 6, wherein the plated cast component is produced from a method comprising:
doping the viscosity reducing semiconductor material with the electrically active dopant to form the doped viscosity reducing semiconductor material with an increased electrical conductivity;
mixing the doped viscosity reducing semiconductor material with the base material to form the mixture having uniform electrical conductivity
forming the mixture into a cast part using a casting process; and
applying a plating material to an outer surface of the cast part using an electroplating process,
wherein a consistency of the electroplating process is improved by the uniform electrical conductivity of the mixture.

12. The plated cast component of claim 11, wherein the electrically active dopant is one of an n-type dopant or a p-type dopant.

13. The plated cast component of claim 11, wherein the plating material comprises at least nickel, palladium, gold, or copper.

14. The plated cast component of claim 13, wherein the electroplating process increases a surface hardness of the cast part.

15. The plated cast component of claim 13, wherein the electroplating process increases a corrosion resistance of the cast part.

16. The plated cast component of claim 11, the method further comprising:
prior to doping the viscosity reducing semiconductor material with the electrically active dopant, purifying the viscosity reducing semiconductor material to substantially remove impurities.

17. The plated cast component of claim 11, wherein the electrically active dopant prevents splotches from forming on the outer surface of the plated cast component during the electroplating process.

* * * * *